United States Patent
Nakaoka et al.

(10) Patent No.: US 6,340,454 B1
(45) Date of Patent: Jan. 22, 2002

(54) α-LITHIUM ALUMINATE AND METHOD OF MANUFACTURING THE SAME, AND ELECTROLYTE SUPPORT MATERIAL OF MOLTEN CARBONATE FUEL CELL

(75) Inventors: Yasuhiro Nakaoka; Nobuyuki Yamazaki, both of Tokyo; Takenori Watanabe, Ichikawa, all of (JP)

(73) Assignee: Nippon Chemical Industries Co., Ltd., Tokyo (JP)

( * ) Notice: Subject to any disclaimer, the term of this patent is extended or adjusted under 35 U.S.C. 154(b) by 0 days.

(21) Appl. No.: 09/472,830

(22) Filed: Dec. 28, 1999

(30) Foreign Application Priority Data

Dec. 28, 1998 (JP) ............................................ 10-373300

(51) Int. Cl.⁷ ............................ C01F 7/00; C01D 15/00; H01M 8/14
(52) U.S. Cl. .......................................... 423/600; 429/16
(58) Field of Search ................................ 423/600, 119; 429/16, 46, 12

(56) References Cited

U.S. PATENT DOCUMENTS 4,216,278 A * 8/1980 Arendt et al. ................ 429/188

5,827,495 A * 10/1998 Tomimatsu et al. ......... 423/600

FOREIGN PATENT DOCUMENTS

| JP | 61-10057 | * | 1/1986 | ................. 423/600 |
| JP | 63-151614 | * | 6/1988 | ................. 423/600 |
| JP | 63-151615 | * | 6/1988 | ................. 423/600 |
| JP | 5-294614 | * | 11/1993 | ................. 423/600 |

OTHER PUBLICATIONS

Kinoshita, et al., "Synthesis of fine particle size lithium aluminate . . . ", Mat. Res. Bull., vol. 14, No. 10, pp. 1357–1368, 1979, no month.*

* cited by examiner

*Primary Examiner*—Steven Bos
(74) *Attorney, Agent, or Firm*—Armstrong, Westerman, Hattori, McLeland & Naughton, LLP

(57) ABSTRACT

An α-lithium aluminate obtained through a solid-phase reaction of a γ-alumina and a lithium compound, wherein said α-lithium aluminate comprises particles having a round shape, with a BET specific surface area in the range of 4–7 $m^2/g$, and substantially not including γ-lithium aluminate. Further, said α-lithium aluminate is manufactured by dry-mixing a γ-alumina having a BET specific surface area in the range of 70–140 $m^2/g$ and a lithium compound, and then baking and reacting said compound in solid-phase.

9 Claims, 3 Drawing Sheets

α-LITHIUM ALUMINATE AND METHOD OF MANUFACTURING THE SAME, AND ELECTROLYTE SUPPORT MATERIAL OF MOLTEN CARBONATE FUEL CELL

FIELD OF THE INVENTION

The present invention relates to an α-lithium aluminate ($LiAlO_2$) which may be used advantageously as an electrolyte supporting plate of a molten carbonate-type fuel cell (MCFC), and the method of manufacturing the same.

DESCRIPTION OF THE RELATED ART

An electrolyte supporting plate of an MCFC is used to support a mixed molten carbonate such as lithium carbonate ($Li_2CO_3$), potassium carbonate ($K_2CO_3$), sodium carbonate ($Na_2CO_3$) and the like, under a high temperature range around 650° C. Therefore, the material for such supporting plate is required to have properties such as high support ability to molten carbonate, stability of particle shape, alkali resistance, heat resistance and the like. As a material satisfying such requirements, a lithium aluminate is used conventionally as the material forming the electrolyte supporting plate. Especially, a fine γ-lithium aluminate with a relatively large specific surface area and having an advantageous electrolyte supporting power is utilized.

Many methods for manufacturing the γ-lithium aluminate with a large specific surface area are disclosed, for example in Japanese Laid-Open Patent Publications 60-65719, 60-151975, 61-295227, 61-295228, 63-270311, 1-252522, 2-80319 and the like. These known methods mainly characterize in that a mixture of alumina ($Al_2O_3$) and lithium hydroxide (LiOH) or lithium carbonate is baked under a temperature in the range of 600–1000° C. so as to restrain the fining of the structure, or to increase the specific surface area of the material by providing a secondary process forming a porous structure or by providing a hydration process.

Recently, it has been discovered that an α-lithium aluminate is also useful as an electrolyte supporting plate in an MCFC.

Japanese Laid-Open Patent Publication 2-243511 discloses a method of manufacturing a high crystalline α-lithium aluminate.

Moreover, Japanese Laid-Open Patent Publication 9-97620 discloses a method of heat-treating a mixture of carbonate including lithium carbonate and alumina powder having a specific surface area of over 100 $m^2/g$ in molten carbonate heated to 700–800° C.

Even further, Japanese Laid-Open Patent Publication 10-112329 discloses a method of heat-treating a mixture of carbonate including lithium carbonate and aluminum hydroxide powder having a specific surface area of over 100 $m^2/g$ in molten carbonate heated to 700–800° C.

The above methods all involve heat-treating alumina or lithium aluminate material in molten carbonate. Such methods require long reaction time ranging from 50 hours to 100 hours. Further, the methods inevitably require a step of washing and drying the product for removal of carbonate, which complicates the manufacturing steps and increases the cost.

SUMMARY OF THE INVENTION

As mentioned above, the prior art of manufacturing an α-lithium aluminate does not fully respond to the needs for an advanced supporting material which realizes a longer lifetime of the MCFC, which includes advanced supportability of molten carbonate, and improved alkali resistance and heat resistance.

In order to solve the problems of the prior art, the present inventors have discovered through studies that an α-lithium aluminate obtained by mixing a porous γ-alumina and a lithium compound so that the Li/Al mol ratio is set approximate the stoichiometry ratio and baking said material has improved properties in that the particle structure of the product does not change even when being heated for long hours in molten carbonate, and that the product provides advanced alkali resistance, heat resistance and very high level of supportability.

The present invention is completed based on the above discovery. The object of the invention is to provide an α-lithium aluminate guaranteeing advanced thermal stability and chemical stability in molten carbonate which is especially suited as the material for the electrolyte supporting plate in an MCFC, and to provide a method of manufacturing said α-lithium aluminate having stable properties in molten carbonate by steps of simply dry-mixing the material powder and baking the same, which involves no complicated manufacturing steps.

The present invention relates to an α-lithium aluminate obtained through solid-phase reaction of a γ-alumina and a lithium compound, wherein said α-lithium aluminate comprises particles having a round shape, with a BET specific surface area in the range of 4–7 m2/g, and substantially not including γ-lithium aluminate.

Moreover, the present invention relates to an α-lithium aluminate disclosed above, wherein an average particle size (C2) measured by a laser method is in the range of 0.5–2.0 μm, and the ratio (D=C2/C1) of said average particle size (C2) to a particle size (C1) calculated through spherical conversion based on said BET specific surface area is in the range of 2–4.

Even further, the present invention relates to a method of manufacturing an α-lithium aluminate, including the steps of dry-mixing a γ-alumina having a BET specific surface area in the range of 70–140 $m^2/g$ and a lithium compound, and then baking and reacting said mixture in a solid state.

The present invention further relates to a method of manufacturing an α-lithium aluminate disclosed above, wherein a γ-alumina having an average particle size in the range of 0.7–2.0 μm measured by a laser method is utilized as a starting material. Moreover, the present invention relates to a method of manufacturing an α-lithium aluminate disclosed above, wherein the mol ratio (Li/Al) of said γ-alumina to said lithium compound is adjusted to 0.95–1.05 when dry-mixing, before performing said baking process.

Even further, the present invention relates to a method of manufacturing an α-lithium aluminate disclosed above, wherein the ratio (Y=X2/X1) of the average particle size (X1) of the material γ-alumina measured by a laser method to the average particle size (X2) of the produced α-lithium aluminate measured by a laser method is in the range of 0.7–1.0.

The present invention also relates to an electrolyte support material of a molten carbonate fuel cell formed of said α-lithium aluminate defined above.

DETAILED DESCRIPTION OF PREFERRED EMBODIMENTS

Figure 1:
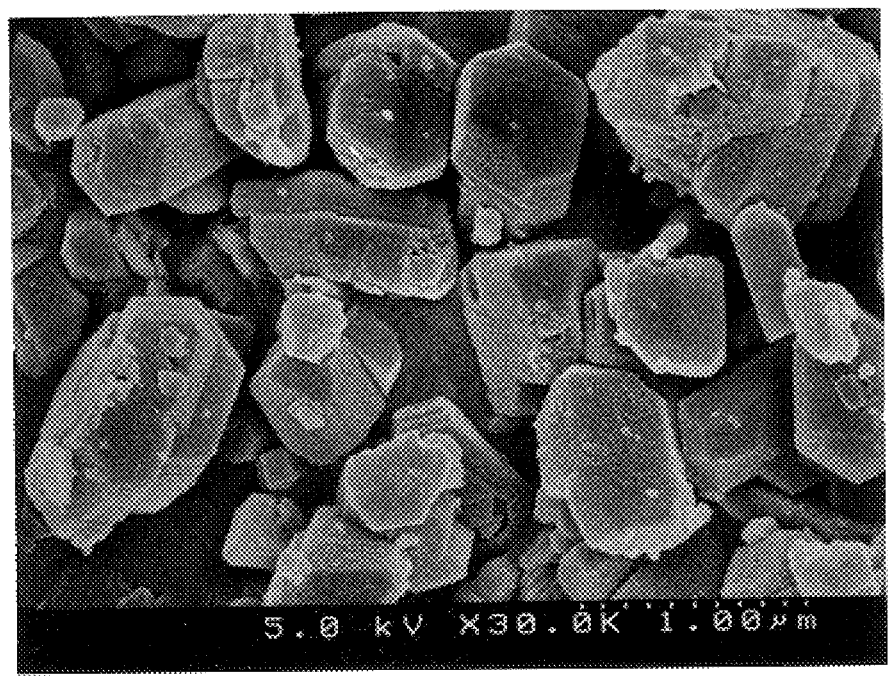
FIG. 1 is a ×30000 SEM photograph of the γ-alumina material used in example 1 of the present invention.

The α-lithium aluminate according to the present invention comprises particles having a round particle shape, with a BET specific surface area in the range of 4–7 $m^2/g$, and preferably in the range of 4–5 $m^2/g$.

The particles are round which are either independent or bonded with plurality of other particles. They may be observed through SEM photographs.

The α-lithium aluminate of the present invention does not substantially include γ-lithium aluminate, and this can easily be confirmed by an X-ray diffraction analysis method.

The average particle diameter size (C2) of the α-lithium aluminate measured by a laser method is in the range of 0.5–2.0 $\mu$m. The size may be measured by a wet-laser type particle size distribution measuring equipment such as a MICROTRAC (trademark).

An important property related to the average particle size is that the ratio (D=C2/C1) of the particle diameter (C1) calculated through spherical conversion based on the BET specific surface area of the particle to the average particle diameter (C2) measured by the laser method is 4 or less, preferably in the range of 2–4. When such ratio exceeds 4, the porosity of the particles become high, and when such material is used as the electrolyte supporting plate, the change of particles in the molten salt becomes high, which leads to unfavorable supportability. When the ratio is less than 2, it is not preferable since γ-types partially appear.

The α-lithium aluminate of the present invention having the above-mentioned range of property provides great supporting ability in molten carbonate, but if it is beyond the above range, it will not function fully as an electrolyte supporting plate.

In order to industrially manufacture the α-lithium aluminate of the present invention, a γ-alumina having a BET specific surface area in the range of 70–140 $m^2/g$ and a lithium compound are dry-mixed in a ratio approximate the stoichiometry ratio, and the mixture is then baked.

The ratio approximate the stoichiometry ratio refers to a mol ratio (Li/Al) in the range of 0.95–1.05, and preferably in the range of 0.98–1.02. When the ratio exceeds the range, residual of unreacted material may occur. The reaction according to the present invention characterizes in that the material are mixed in a dry state, and the reaction is performed by a solid phase reaction of the material.

A further characteristic of the invention is the γ-alumina used as the material. The γ-alumina has a BET specific surface area in the range of 70–140 $m^2/g$, and an average particle diameter measured by the laser method in the range of 0.7–2.0 $m^2/g$, which is highly porous. The X-ray diffraction peak of the γ-alumina is broad, so the crystallinity of the material is low.

On the other hand, the lithium compound utilized as lithium source may be lithium carbonate, lithium hydride, lithium nitrate and the like, but for the purpose of the present invention, the use of lithium carbonate is most effective. The lithium compound is used in the form of powder having an average particle size of 10 $\mu$m or less, and more preferably in the form of fine powder with an average particle size of 5 $\mu$m or less.

The γ-alumina and the lithium compound powder are mixed in an equivalent ratio approximate the stoichiometry for obtaining α-lithium aluminate, under a dry condition. During the mixing step, if the mutual dispersion of the material powder is insufficient, the α-lithium aluminate particles produced by the reaction partially cohere, and the particles become coarse. Therefore, in order to gain a unified mixed dispersed state of the material, a mixing device of one kind or mixing devices of more than two kinds selected from a fast dispersion mixer such as a henschel mixer, or an impact grinder such as a jet-mill, an atomizer or a bantam mill should preferably be used for the process. However, the grind-crush type mixer such as a ball mill utilized in the prior art is not appropriate for use according to the object of the present invention since such mixer tends to destroy the particle structure of the porous γ-alumina.

The material mixture is then baked. The baking process is performed for 0.5–24 hours under a temperature range of 600–800° C., and preferably for 1–10 hours under a temperature in the range of 700–780° C. Solid-phase reaction of porous γ-alumina particles and a lithium compound are performed to produce an α-lithium aluminate. It may be confirmed through X-ray diffraction that the gained product is a lithium aluminate mainly comprising α-type crystals.

However, according to the relation of the baking temperature and the baking time, the particle diameter or the crystal shape of the gained lithium aluminate may vary according to the baking time, even when the reaction is performed by the same material under the same baking temperature. Generally, if the baking process is long, α-type crystals and partially γ-type crystals are produced, and if the baking is performed under higher temperature, γ-type crystals are produced in a shorter time.

The method of manufacturing the lithium aluminate of the present invention therefore should be performed by appropriately selecting the specific surface area of the material, the baking temperature and the baking time in order to gain a preferred lithium aluminate.

The specific surface area of the α-lithium aluminate obtained by the above-mentioned method of the present invention depends on the particle shape of the material γ-alumina.

For example, when the ratio (X2/X1) of the average particle diameter (X1) of the material γ-alumina measured by a laser method to the average particle diameter (X2) of the produced α-lithium aluminate measured by a laser method is (Y), then the value is 0.7–1.0. This may be confirmed easily by observing the SEM photograph of the material γ-alumina and the α-lithium aluminate produced by the present method.

The α-lithium aluminate particles manufactured as mentioned above has a BET specific surface area in the range of 4–7 $m^2/g$, with a round particle shape, and the average particle diameter measured by the laser method is in the range of 0.5–2.0 $\mu$m, which substantially does not include γ-lithium aluminate.

The α-lithium aluminate having such particle properties has an advantageous thermal stability and chemical stability inside a heated molten carbonate, so the material is most preferable as an electrolyte supporting plate in an MCFC.

EXAMPLES

The examples of a preferred embodiment of the present invention will now be explained in detail with comparison to the comparative examples. However, the range of the present invention is not limited to such examples.

Example 1

Figure 2:
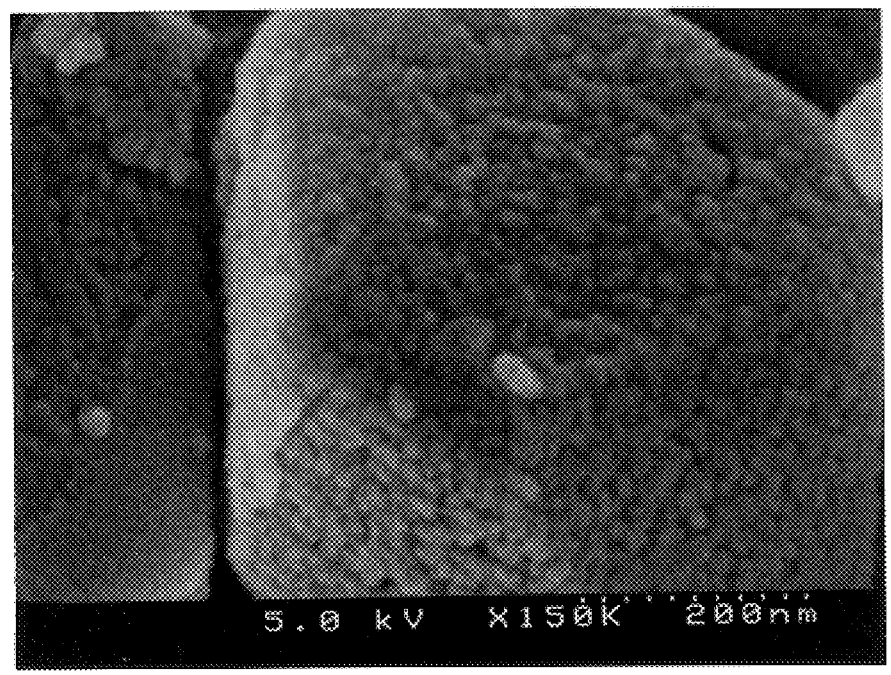
FIG. 2 is a ×150000 SEM photograph of the γ-alumina material used in example 1 of the present invention.
Figure 3:
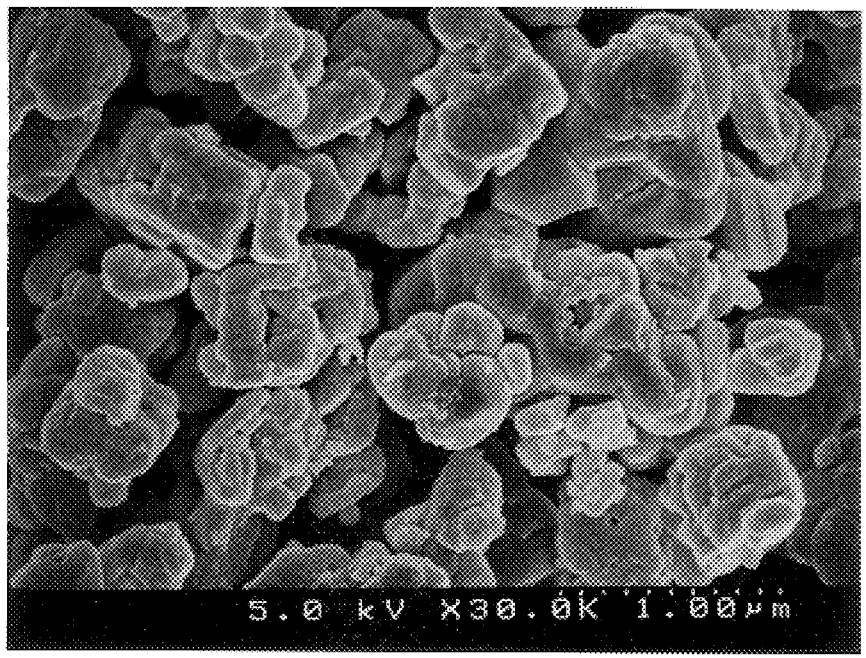
FIG. 3 is a ×30000 SEM photograph of the α-lithium aluminate obtained by example 1.

A γ-alumina (SEM photograph: FIGS. 1 and 2) having a BET specific surface area of 95 m²/g and an average particle diameter of 1.35 μm measured by a laser method and a lithium carbonate are measured so that the mol ratio of lithium to aluminum is 1. The material is mixed in a mixer, and filled inside an alumina crucible, which is then baked for 10 hours under a temperature of 740° C. in an electric furnace. The baked product comprises only α-lithium aluminate, and the average particle diameter of the product is 1.02 μm, with a BET specific surface area of 4.4 m²/g (SEM photograph: FIG. 3). Further, value D which is the ratio (C2/C1) of the particle diameter (C1) calculated through spherical conversion based on the BET specific surface area to the average particle diameter (C2) measured by the laser method of the baked α-lithium aluminate is 2.55. Further, value Y which is the ratio (X2/X1) of the average particle diameter (X1) of the material γ-alumina measured by the laser method to the average particle diameter (X2) of the produced α-lithium aluminate measured by the laser method is 0.78. The results are shown in Table 1.

The gained α-lithium aluminate is mixed by ratio of 1:3 by weight with a carbonate, formed by mixing lithium carbonate and sodium carbonate by ratio of 53:47 by mol. The mixture is filled in an alumina crucible, which is then placed inside an electric furnace maintaining the temperature to 680° C. A gas mixing air, nitrogen and $CO_2$ in a volume ratio of 5:4:1 is heated to 60° C. and flown into the electric furnace for a long time. Samples obtained at every predetermined time are washed in a solution mixing even amounts of acetic acid and acetic anhydride so as to remove the carbonate, which is then filtered, washed by ethanol and dried. The specific surface area of the obtained lithium aluminate is measured, and the stability in molten carbonate is tested. The specific surface area after 500 hours is 85% to the value at the starting of use.

Further, a MICROTRAC particle size analyzer 9320-X100 (a product of Nichikiso k.k.) is used to perform the laser method measurement.

Example 2

The sample mixed as explained in Example 1 is baked for 6 hours under a temperature of 760° C. in the electric furnace. The baked product comprises only of α-lithium aluminate, with an average particle size of 1.07 μm and a specific surface area of 5.7 m²/g. The value D is 3.41 and the value Y is 0.79. The results are shown in Table 1.

Example 3

The sample mixed as explained in Example 1 is baked for 8 hours under a temperature of 740° C. in the electric furnace. The baked product comprises only of α-lithium aluminate, with an average particle size of 1.06 μm and a specific surface area of 6.2 m²/g. The value D is 3.76 and the value Y is 0.79. The results are shown in Table 1.

Comparative Example 1

Figure 4:
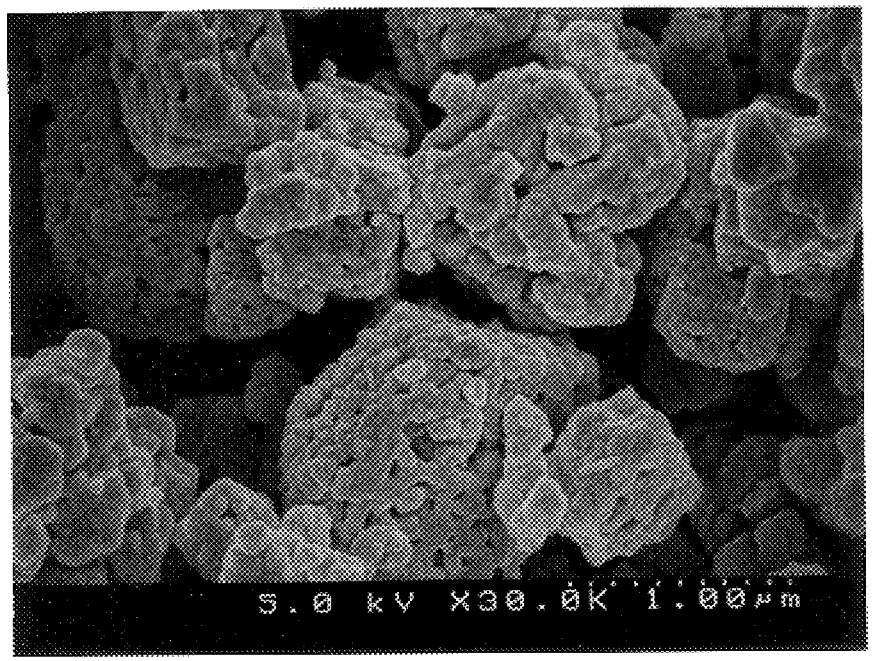
FIG. 4 is a ×30000 SEM photograph of the α-lithium aluminate obtained by comparative example 1.

The sample mixed as explained in Example 1 is baked for 4 hours under a temperature of 760° C. in the electric furnace. The baked product comprises only of α-lithium aluminate, with an average particle size of 0.90 μm and specific surface area of 8.0 m²/g (SEM photograph: FIG. 4).

The value D is 4.07 and the value Y is 0.67. The results are shown in Table 1.

Further, the stability of the product in molten carbonate is checked as explained in Example 1. The specific surface area after 500 hours is 49% to the value at the start of use.

Comparative Example 2

The sample mixed as explained in Example 1 is baked for 8 hours under 760° C. in the electric furnace. The baked product is a mixture of α-lithium aluminate and γ-lithium aluminate with an average particle size of 1.11 μm and a specific surface temperature of 3.1 m²/g. The value D is 1.97 and the value Y is 0.82. The results are shown in Table 1.

Comparative Example 3

Figure 5:
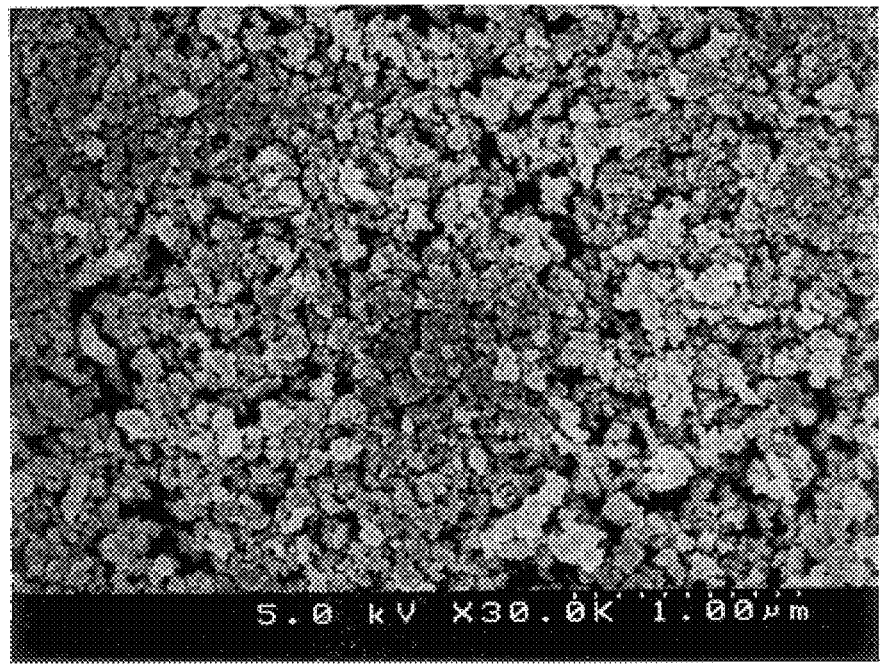
FIG. 5 is a ×30000 SEM photograph of the γ-alumina material used in comparative example 3.
Figure 6:
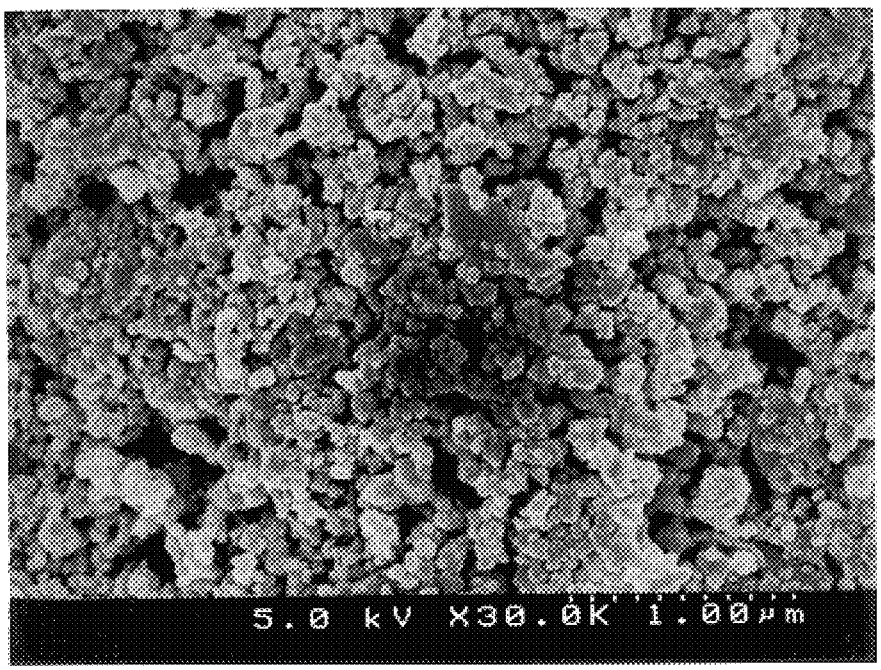
FIG. 6 is a ×30000 SEM photograph of the mixture of α-lithium aluminate and γ-lithium aluminate obtained by comparative example 3.

A γ-alumina (SEM photograph: FIG. 5) having a specific surface area of 68 m²/g and a particle size of approximately 0.03 μm (observed by SEM) and a lithium carbonate is measured so that the mol ratio of lithium to aluminum is 1. This is mixed in a mixer, and filled inside an alumina crucible, which is then baked for 2 hours under 760° C. in an electric furnace. The baked product is a mixture of α-lithium aluminate and γ-lithium aluminate, with a specific surface area of 23.4 m²/g and a particle size of approximately 0.06 μm (observed by SEM) (SEM photograph: FIG. 6). The results are shown in Table 1.

TABLE 1

| | Ex 1 | Ex 2 | Ex 3 | Com Ex 1 | Com Ex 2 | Com Ex 3 |
|---|---|---|---|---|---|---|
| specific surface area of material γ alumina (m²/g) | 95 | 95 | 95 | 95 | 95 | 68 |
| baking temperature (° C.) | 740 | 760 | 740 | 760 | 760 | 760 |
| baking hour (hr) | 10 | 6 | 8 | 4 | 8 | 2 |
| specific surface area of $LiAlO_2$ (m²/g) | 4.4 | 5.7 | 6.2 | 8.0 | 3.1 | 23.4 |
| crystal structure of $LiAlO_2$ | α | α | α | α | α + γ | α + γ |
| average particle size of $LiAlO_2$ (μm) | 1.02 | 1.07 | 1.06 | 0.90 | 1.11 | — |
| D | 2.55 | 3.41 | 3.76 | 4.07 | 1.97 | — |
| Y | 0.78 | 0.79 | 0.79 | 0.67 | 0.82 | — |

The present invention provides an α-lithium aluminate which guarantees advantageous thermal stability and chemical stability in molten carbonate which may preferably be used as an electrolyte supporting plate in an MCFC, and also provides a method for manufacturing an α-lithium aluminate having stability in molten carbonate which involves no complicated steps, by simply dry-mixing powdered material and baking the same.

We claim:

1. An α-lithium aluminate obtained through a solid-phase reaction of a γ-alumina and a lithium compound, wherein said α-lithium aluminate comprises particles having a round shape, with a BET specific surface area in the range of 4–7

$m^2/g$, and wherein γ-lithium aluminate is not detectable by X-ray diffraction.

2. An α-lithium aluminate according to claim 1, wherein an average particle size (C2) is in the range of 0.5–2.0 μm, and the ratio (D=C2/C1) of said average particle size (C2) to a particle size (C1) calculated through spherical conversion based on said BET specific surface area is in the range of 2–4.

3. An electrolyte support material of a molten carbonate fuel cell formed of said α-lithium aluminate defined in claims 1 or 2.

4. A method of manufacturing an α-lithium aluminate, including the steps of dry-mixing a γ-alumina having a BET specific surface area in the range of 70–140 $m^2/g$ and a lithium compound, and then baking and reacting said mixture in a solid state.

5. A method of manufacturing an α-lithium aluminate according to claim 4, wherein a γ-alumina having an average particle size in the range of 0.7–2.0 μm is utilized as a starting material.

6. A method of manufacturing an α-lithium aluminate according to claim 4, wherein the mol ratio (Li/Al) of said γ-alumina to said lithium compound is adjusted to 0.95–1.05 when dry-mixing, before performing said baking process.

7. A method of manufacturing an α-lithium aluminate according to claims 4, 5 or 6, wherein said lithium compound is selected from the group consisting of lithium carbonate, lithium hydroxide and lithium nitrate.

8. A method of manufacturing an α-lithium aluminate according to claim 5 or 6, wherein the ratio (Y=X2/X1) of the average particle size (X1) of the material γ-alumina to the average particle size (X2) of the produced α-lithium aluminate is in the range of 0.7–1.0.

9. A method of manufacturing an α-lithium aluminate according to claim 7, wherein the ratio (Y=X2/X1) of the average particle size (X1) of the material γ-alumina to the average particle size (X2) of the produced α-lithium aluminate is in the range of 0.7–1.0.

* * * * *

UNITED STATES PATENT AND TRADEMARK OFFICE
CERTIFICATE OF CORRECTION

PATENT NO.         : 6,340,454 B1
APPLICATION NO.    : 09/472830
DATED              : January 22, 2002
INVENTOR(S)        : Yasuhiro Nakaoka et al.

It is certified that error appears in the above-identified patent and that said Letters Patent is hereby corrected as shown below:

On the title page item (75); Assignee,

Please correct the assignee name, "Nippon Chemical Industries Co., Ltd." to be
--Nippon Chemical Industrial Co., Ltd.--

Please insert the second assignee information, which should read
--Ishikawajima-Harima Jukogyo Kabushiki Kaisha, Tokyo (JP)--.

Signed and Sealed this

Twenty-ninth Day of January, 2008

JON W. DUDAS
*Director of the United States Patent and Trademark Office*